United States Patent [19]
Toomey

[11] 3,765,729
[45] Oct. 16, 1973

[54] AUTOMOTIVE VEHICLE EMERGENCY AIR BRAKE SYSTEM

[76] Inventor: Francis J. Toomey, 1888 Kearns Ave., Pittsburgh, Pa. 15220

[22] Filed: May 15, 1972

[21] Appl. No.: 253,366

Related U.S. Application Data

[63] Continuation-in-part of Ser. No. 870,372, Nov. 19, 1969.

[52] U.S. Cl. .................................. 303/13, 188/345
[51] Int. Cl. .............................................. B60t 15/16
[58] Field of Search ................................ 60/54.5 E; 188/106 P, 345; 303/13, 60

[56] References Cited
UNITED STATES PATENTS

| | | | |
|---|---|---|---|
| 3,680,314 | 8/1972 | Toomey | 303/13 X |
| 2,918,148 | 12/1959 | Uhlenhaut et al. | 188/345 |
| 2,937,502 | 5/1960 | Kenyon | 188/345 X |
| 3,236,340 | 2/1966 | Carruth | 188/345 |
| 3,679,030 | 7/1972 | Kawabe | 188/106 P X |
| 3,477,549 | 11/1969 | Barton | 188/106 P X |

*Primary Examiner*—Duane A. Reger
*Attorney*—William J. Ruano

[57] ABSTRACT

One form of the invention is an automotive vehicle, hydraulic emergency brake system comprising two parallel systems, one operated by the foot pedal brake and the other, by the emergency brake. To each wheel cylinder is connected a Tee valve having one arm connected to each system and which Tee valve is pressure-responsive so as to automatically close off whichever system has developed a leak, whereby the other system can still operate all four wheel brakes.

Another form of the invention is a similar system for an air brake system for buses, tractors and trailers, wherein a hand operated valve is used as the emergency valve for emergency braking.

2 Claims, 5 Drawing Figures

Patented Oct. 16, 1973 3,765,729
2 Sheets-Sheet 1
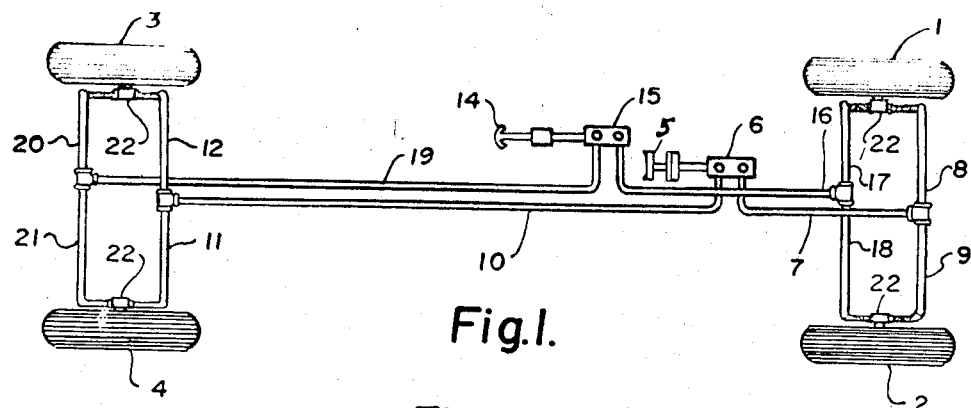
Fig.1.
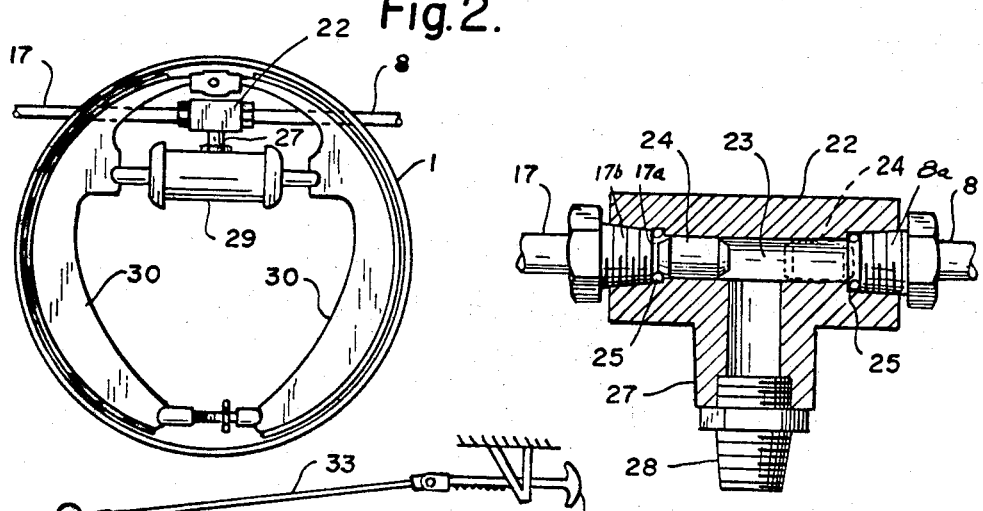
Fig.2.
Fig.3.
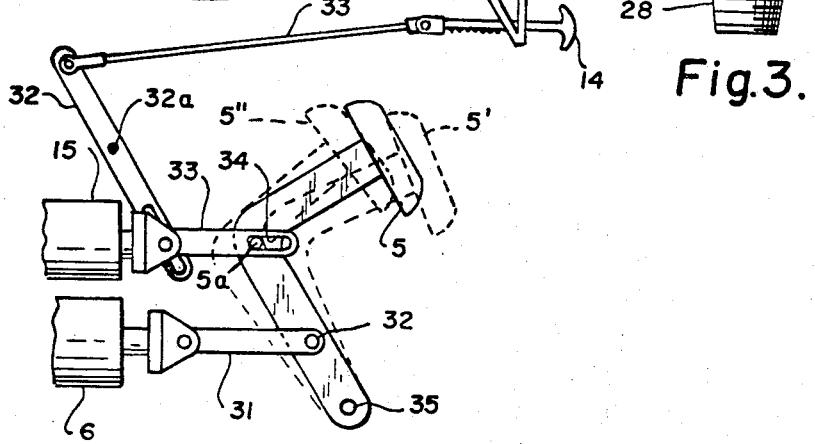
Fig.4.

AUTOMOTIVE VEHICLE EMERGENCY AIR BRAKE SYSTEM

This is a continuation-in-part of Ser. No. 870,372, filed Nov. 19, 1969.

This invention relates to a hydraulic or air emergency brake system for automotive vehicles and the like and is useful for other similar hydraulic or fluid pressure systems, such as steering systems and the like.

An outstanding disadvantage of conventional vehicle hydraulic brake systems is that if the master cylinder of the foot brake system fails, all four wheel brakes become inoperative. Dependence then must be made on a mechanical emergency brake system which generally operates the two rear wheels. Such mechanical emergency brake systems are rarely adjusted properly so that either the right or left brake applies first, making the vehicle swerve and subject to danger, — also mechanical brakes do not bring present vehicles to a safe complete stop in a relatively short distance when the car is running at a high rate of speed.

An object of the present invention is to provide a novel emergency brake hydraulic (or air) system which overcomes the abovenamed disadvantages and which will enable braking of all four wheels hydraulically or by air pressure even in the event of a break and leakage of liquid in the hydraulic system.

A more specific object of the invention is to provide two parallel systems for operating the four hydraulic brakes of a vehicle, one parallel system operated by a foot pedal and the other, by the emergency brake, and involving a valve mounted on each wheel which selectively introduces hydraulic fluid to either one system or the other while sealing off the system in which a leak occurs.

Another object of the present invention is to provide, in an automotive emergency hydraulic or air brake system, a novel Tee valve mounted on each wheel and connected to the wheel cylinder, which valve will automatically shut-off the pedal brake hydraulic system or hand brake air system if a leakage occurs therein and enable application of all four of the same hydraulic or air brakes by the emergency brake.

A still further object of the invention is to provide an emergency hydraulic or air brake system which can be easily, quickly and inexpensively adapted to conventional hydraulic or air brake systems in a minimum amount of time, with very little effort and at very low costs.

Other objects and advantages will become more apparent from a study of the following description taken with the accompanying drawings wherein:

FIG. 1 is a plan and somewhat schematic view of a vehicle emergency hydraulic brake system embodying the present invention;

FIG. 2 is an enlarged, side view of one of the four hydraulic brakes, showing the Tee valve embodied in the present invention connected to the wheel cylinder;

FIG. 3 shows an enlarged, cross-sectional view of the Tee valve shown in FIG. 2;

FIG. 4 shows a modification, illustrating how a single brake operating pedal may operate, automatically in succession, the hydraulic pedal brake system and then the emergency brake system when the former fails; and, FIG. 5 shows a further modification comprising an automotive air brake system for a tractor and trailer.

Figure 5:
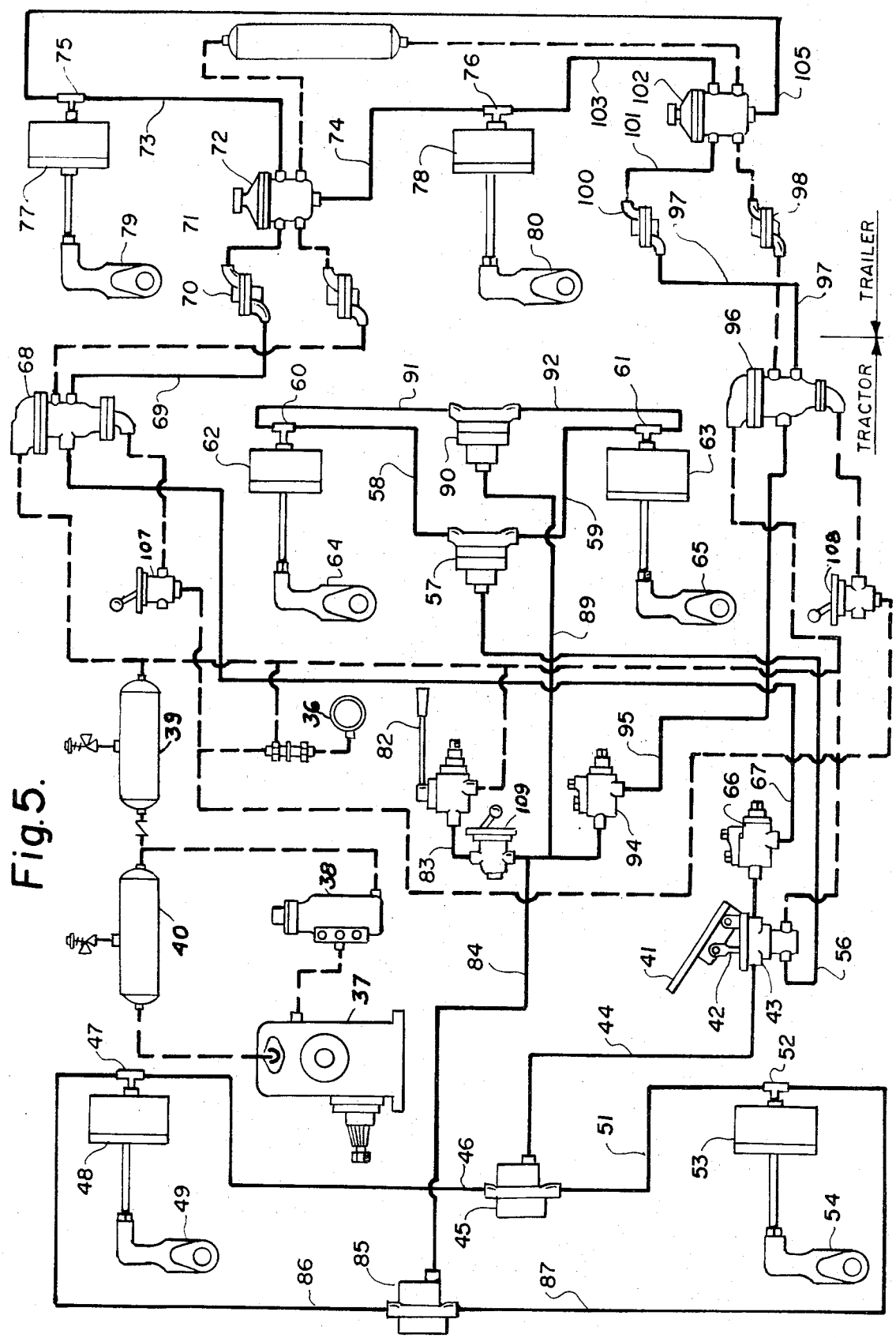

Referring more particularly to FIG. 1 of the drawing, numerals 1, 2, 3 and 4 denote the respective four wheels and associated hydraulic brakes. Numeral 5 denotes the brake pedal for conventional dual master cylinder 6 so as to exert pressure in front conduits 7, 8 and 9, which, in turn, are connected to one arm of Tee valves 22 connected to the front wheel brakes. Similarly, and simultaneously fluid pressure in rear conduits 10, 11 and 12 introduce fluid under pressure to one arm of the respective Tee valves 22 so as to pressurize the rear wheel cylinders, such as 29, shown in FIG. 2 and the rear brakes.

A parallel connected emergency brake system is provided which is actuated by the emergency brake 14, which may be either a hand brake or a foot brake, and which emergency brake operates the conventional dual master cylinder 15 so that hydraulic liquid under pressure is conveyed to front conduits 16, 17 and 18 to the other arms of Tee valves 22 to introduce liquid, under pressure, in the front wheel cylinders 29. Similarly, and simultaneously fluid under pressure is conducted through rear conduits 19, 20 and 21 to the other arms of Tee valves 22 of the rear brake.

FIG. 3 more clearly illustrates the construction and operation of each of the four Tee valves 22. In a cylindrical bore 23 there slides a cylindrical valve operating element 24 having tapered ends which are adapted to sealingly engage correspondingly shaped seats 17a formed in the ends of threaded couplings 17b. O rings 25 seal element 24 to bore 23 and frictionally hold it in position. Normally, brake fluid under pressure in the conventional brake system operated by pedal 5 will be introduced through conduit 8 and will force the brake operating element 24 to the left or full line position, as viewed in FIG. 3, so that under normal conditions, the hydraulic emergency brake system, operated by emergency brake 14, will be sealingly closed off the existing brake system by virtue of the sealing connection made between the left tapered end portion of element 24 and seat 17a. In some instances, a biasing spring (not shown) may be interposed between the right side of element 24 and the end of threaded coupling 8a at the right of valve 22.

When it is desired to apply the foot pedal 5, braking fluid will pass through paths identical to that shown in FIG. 3 through all four of the Tee valves 22 so as to actuate the wheel cylinders 29 and apply all four hydraulic brakes.

However, when the emergency brake 14 is applied because of a leak in the pedal operated normal brake system, it will create a greater pressure on the left side of element 24 than on the right side, as viewed in FIG. 3, so as to force it to move to the right, that is, to the dotted line position, as shown, into sealing engagement with the correspondingly shaped seat in coupling 8a so as to seal off the conventional pedal brake system connected to conduit 8 and allow fluid pressure to be introduced from conduit 17, connected to the emergency hydraulic brake system, through the threaded connection 28 to the wheel cylinder 29.

Thus, upon application of emergency brake 14, hydraulic fluid will enter through conduit 17 into the leg 27 of the Tee valve 27 and thus pressurize the wheel cylinder 29 so as to operate brake shoes 30.

It will be apparent that if the broken hydraulic line occurs in the front wheel brake system, such as in conduit 7, 8 or 9, application of the emergency brake 14 will be still effective to apply the front and rear hydraulic brakes because lines 8 and 9 are sealed off of the system by 0 rings 25 shown at the right of FIG. 3. Similarly, if there is a broken line in the rear wheel brake system, such as in conduits 11 and 12, Tee valves 22 will automatically seal off such lines and enable hydraulic fluid to be introduced from conduit 19 to parallel connected conduits 20 and 21 to the other arm of the Tee valve 22 so as to apply the rear brakes, as well as the front brakes, to thus enable applying all four brakes hydraulically.

If, however, a broken hydraulic wheel cylinder occurs in the front, the front wheel brakes would be lost to the conventional foot pedal system and to the front wheel emergency brakes, but the rear wheel brakes can be applied hydraulically, either by foot pedal 5 or emergency brake 14. Similarly, if there occurs a broken wheel cylinder in the rear, the rear wheel brakes will be lost to the foot pedal system and to the emergency system, but the front wheel brakes can be applied hydraulically by either the foot pedal 5 or emergency brake 14.

When it is realized that many brake failures are due to failure of the master cylinder, it will appear that normally, in case of breakage in the line, all four hydraulic brakes can still be applied by the emergency brake 14, which brake 14 is held in reserve at all times. In other words, there is always present an additional reserve of hydraulic fluid to be used by operating the emergency brake 14. In order to lose the hydraulic brake on both brake systems at one time, it would be necessary to break the hydraulic lines in four different places at the same time, which is almost impossible.

FIG. 4 shows a modification illustrating how the emergency brake and foot brake may be interconnected, if desired, to avoid time loss by the operator in reacting to a possible accident, so that when the foot pedal operates within normal limits, such as between 5 and 5', its pin 5a would travel merely to the end of slot 34 in link 33 and operate only the conventional dual master cylinder 6 through pin 32 connected to link 31. However, should a leak occur in the pedal to be depressed abnormally to position 5'', this will cause actuation of the emergency dual master cylinder 15 and cause operation of the emergency hydraulic brake system. Of course, other means for sequentially operating the normal brake system and emergency brake system by a single pedal will be readily suggested to those skilled in the art.

While the above system has been described as a hydraulic one, it may also be used in air brakes having one side of the Tee valve 22 attached to the foot treadle system on the tractor and the other side attached to the hand valve. A double set of air lines would be needed on the trailer. Thus, if air is lost in the foot treadle system, then by applying the hand valve, the Tee valves are activated, sealing off the leak in the foot treadle system and enabling applying the brakes with the hand valve system. Thus, the vehicle is not stopped in a dangerous place or where it is not desired to be stopped. Upon release of the hand valve, the vehicle may be moved to a garage where it may be repaired.

While the parallel hydraulic system of the present invention has been described for braking of a vehicle, it may be used for operating a steering mechanism of a ship or plane.

An outstanding feature of the present invention is that it can be very easily, quickly adapted to existing, conventional hydraulic brake systems operated by a foot pedal. This can be done simply by removing the present four hydraulic lines on a car at the backing plate of each wheel leading to the wheel cylinder. Then four Tee valves 22, as shown in FIG. 3, are installed. Each of the hydraulic lines that was removed is connected to one side or arm of the Tee valve. The new dual master cylinder 15 may be installed on the fire wall of the car. The hand emergency brake 14 on the vehicle is then hooked up to activate the newly installed master cylinder 15. Hydraulic lines are installed from the emergency brake master cylinder 15 to the other side of the Tee valve. In the case of the front wheels, rubber hydraulic hoses or other flexible hoses are used to enable steering movements. Therefore, the front hydraulic line goes to the fitting on the frame and the flexible hydraulic hose will extend from this fitting to its associated Tee valve 22.

While Tee valve 22 has been shown as a separate detachable unit, it may, instead, be incorporated in the constrction of cylinder 29 by being embodied in a suitably grooved casting detachably fastened to the wheel cylinder.

The above described system provides a highly efficient hydraulic brake system which enables emergency application of all four brakes hydraulically in case of a leak of the conventional pedal brake operating hydraulic system, also which hydraulic emergency brake will serve very effectively and reliably as a parking hydraulic brake which holds the vehicle stationary far more securely than mechanical safety brakes; furthermore, I have provided parallel hydraulic systems, one operated by the pedal brake and the other operated by the emergency brake, so that if leakage occurs in either system, there will be one remaining system that can operate all four of the brakes hydraulically.

An outstanding advantage of my invention is that it can be easily and inexpensively added to a conventional vehicular hydraulic system simply by adding four Tee valves, one extra dual hydraulic cylinder and two additional lines leading to the Tee valves.

In conventional air brakes for tractor and trailer combinations, (not shown) a hand valve, such as 82, (FIG. 5) is used normally to apply only the trailer brakes. In case of failure of the tractor brakes, such as from leakage of the line, brake pedal 41 is ineffective and the hand valve 82 is applied. This assumes a conventional system as distinguished from the system shown in FIG. 5. If the leak is in the line, such as in conduit 95 of a conventional system (not shown), the operator would lose both sets of brakes, namely, the tractor and trailer brakes. He would have to quickly search to find out whether the leak is in the tractor or trailer system. If it is found that the leak is in the trailer system he must operate a control valve to shut-off trailer brakes, but operation of the hand valve 82 cannot operate the trailer brakes. However, if the tractor system leaks, there is lost the use of the tractor brakes, leaving only the trailer brakes as operative for bringing the entire vehicle load to a stop by application of hand valve 82. Such trailer brakes alone are not very effective to stop a tractor and trailer, particularly when loaded heavily and traveling at high speed or traveling down hill.

FIG. 5 shows a modification of the invention as applied to an air brake system for a tractor and trailer brake system (or for a truck or bus brake system), which overcomes the abovementioned disadvantages of conventional air brake systems.

Compressor 37 pumps air under pressure through governor 38 into reservoirs 39 and 40 which, in turn, feed air under pressure to the conduits illustrated in dotted lines, fed by reservoir 39. The pressure is denoted by air gauge 36.

In operation, upon depressing brake pedal 41 and valve operating element 42, reservoir air pressure, indicated in conduits shown in dotted lines, will pass through valve 43, conduit 44, quick release valve 45, conduit 46, one side of T valve 47 and brake chamber 48 which operates the front brake operating element 49. Quick release valve 45 is also connected to conduit 51, one side of valve 52 and the other front brake chamber 53 which, in turn, is connected to the other front brake operating element 54.

Depression of brake pedal 41 also pressurizes conduit 56 which leads to quick release valve 57, conduits 58 and 59, each leading to one side of T valves 60 and 61, respectively, connected to rear brake chambers 62 and 63, respectively, which, in turn, are connected to rear tractor brake operating elements 64 and 65, respectively. Thus, both the front brakes and rear brakes of the tractor are simultaneously applied by depressing brake pedal 41.

In addition, the trailer brakes are also applied since depression of brake pedal 41 pressurizes stop light switch and double check valve 66, conduit 67, tractor protection valve 68, conduit 69, hose coupling 70, conduit 71, relay emergency valve 72, conduits 73 and 74 to one side of the respective T valves 75 and 76 and trailer brake chambers 77 and 78, respectively, which, in turn, actuate the trailer brake operating elements 79 and 80 so as to apply the trailer brakes.

In the event there is a leak anywhere in the conduit system just described and illustrated by full lines, whereby depression of pedal 41 would be ineffective to apply the brakes, the operator manually applies a TC-2 type hand valve 82 which pressurizes conduits 83 and 84 leading to quick release valve 85, conduits 86 and 87, connected to the other side of T valves 47 and 52 of the front brakes, thereby pushing the sealing piston or slide valve therein to the opposite side of the T valve to close it, so as to apply full braking pressure to front brake chambers 48 and 53, despite the leak, and thereby apply the front brakes.

Additionally, pressure in conduit 83 pressurizes conduit 89, quick release valve 90, and conduits 91 and 92 leading to the opposite sides of T valves 60 and 61, respectively, so as to slide the respective sealing pistons or slide valves therein to close off the leak and enable flow of full air pressure into brake chambers 62 and 63 to apply also the rear brakes of the tractor.

The pressure in conduit 83, resulting from operation of hand valve 82, also pressurizes the stop light switch and double check valve 94, conduit 95, tractor protection valve ( TP-2) 96, conduit 97, hose coupling 100, conduit 101, relay (RE4) emergency valve 102, conduit 103 to the other side of T valve 76, thence to the trailer brake cylinder 78, and conduit 105 to the other side of T valve 75 thence to trailer brake chamber 77, thereby shifting the cylindrical valve operating elements in the T valves and applying full pressure to both trailer brakes (and to additional trailer brakes in case there are four, six, etc.).

In short, despite the leak, full braking pressure is applied to all four tractor brakes and both (or all) the trailer brakes simply by operation of the hand valve 82. While only two trailer brakes are illustrated, obviously, additional trailer brakes can be added to make a total of four or six, for example. Control valves 107 and 108 are provided which serve as on and off valves for additional control.

More specifically, the aforesaid operation of the hand valve 82 will actuate all of the T valves 47, 52, 60, 61, 75 and 76 to apply all four tractor brakes and the two ( all) trailer brakes, simultaneously.

In the case of a truck or bus having no trailer, it is necessary merely to disconnect couplings 70, 98 and 100 and to use the pedal 41 and hand valve 82 to operate the tractor brake system illustrated but eliminating the trailer brake cylinders 77 and 78 and T valves 75 and 76, in which event the hand valve 82 applies only the four brakes of the truck or bus whenever the foot pedal 41 is ineffective due to leakage or the like.

Thus it will be seen that I have provided a highly efficient and reliable air brake system for a tractor and trailer combination, or for a bus or truck, which system enables emergency application of all of the brakes, irrespective of leakage of air in the system; furthermore, I have provided parallel air brake systems selectively operated by a foot brake, or by a hand valve in the event of leakage of the foot brake system, to enable application of both trailer and tractor brakes in spite of such leakage to insure safe stoppage of a tractor and trailer combination, thereby overcoming the serious disadvantages of loss of control by conventional air brake systems wherein, in case of such leakage, only the trailer brake can be applied by the hand valve.

While I have illustrated and described several modifications of my invention, it will be understood that these are by way of illustration only and that various changes and modifications may be contemplated within the scope of the following claims.

I claim:

1. An automatic, fluid pressure emergency braking system for automotive vehicles of the tractor-trailer type, comprising four brake operating chambers closely associated with two front and two rear wheel brakes, respectively, of the tractor, a two-way differential valve connected to each of said brake operating chambers, each valve having two separate inlets for selective introduction of fluid under pressure into the associated brake operating chamber in response to the differential pressure of said two inlets, a pair of front brake conduits, each interconnecting an inlet of one differential valve to an inlet of the other differential valve of the front wheel brake operating chambers, a pair of rear brake conduits, each interconnecting an inlet of one differential valve with an inlet of the other differential valve of the rear brake operating chambers, a source of fluid under pressure controlled by a brake pedal and connected to one of each of said front and rear pairs of conduits, a source of fluid under pressure controlled by an emergency brake connected to the other of said front and rear brake pairs of conduits, whereby upon leakage in either of said pairs of conduits, the associated differential valves will close off the leaking conduits from the brake operating system and automatically connect the other of said pairs of conduits to provide sufficient braking fluid under pressure to said four brake operating chambers so as to operate all four brakes of the tractor, and a third pair of brake operating chambers mounted on the trailer and closely associated with a pair of trailer brakes, a two-way differential valve connected to each of said third pair of brake operating chambers, each of which has two separate valve inlets for selective introduction of fluid under pressure into the associated trailer brake operating chamber in response to the differential pressure of said two inlets, a pair of trailer brake conduits, each interconnecting an inlet of one differential valve to an inlet of the other differential valve of the trailer brake operating chambers, said trailer brake operating chambers being normally pressurized by a separate pressure source and controlled by said hand brake in response to operation of said trailer brake differential valves.

2. A braking system as recited in claim 1 wherein said fluid is air and wherein said emergency brake is a hand operated valve and wherein said brake pedal includes an air valve operated by pedal pressure.

* * * * *